United States Patent
Adaikkalavan et al.

(10) Patent No.: US 11,620,124 B2
(45) Date of Patent: Apr. 4, 2023

(54) SYSTEM AND METHOD FOR FLOW RUNTIME VERSIONING

(71) Applicant: salesforce.com, inc., San Francisco, CA (US)

(72) Inventors: Saravanan Adaikkalavan, Fremont, CA (US); Samuel William Bailey, Cardiff (GB); William C. Eidson, Palo Alto, CA (US); Hugh Cockburn, San Francisco, CA (US); Krishna Kumar, San Francisco, CA (US); Hao Wu, Hayward, CA (US); Tim Peng, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/302,105

(22) Filed: Apr. 23, 2021

(65) Prior Publication Data
US 2022/0342658 A1  Oct. 27, 2022

(51) Int. Cl.
G06F 8/656  (2018.01)
G06F 9/445  (2018.01)

(52) U.S. Cl.
CPC ............. *G06F 8/656* (2018.02); *G06F 9/445* (2013.01)

(58) Field of Classification Search
CPC ................................ G06F 8/656; G06F 9/445
USPC ........................................................ 717/170
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |

(Continued)

OTHER PUBLICATIONS

Title: Using flows in information integration, author: F Leymann, published on 2002.*

(Continued)

*Primary Examiner* — Chameli Das
(74) *Attorney, Agent, or Firm* — LKGlobal | Lorenz & Kopf, LLP (57) ABSTRACT

Described is a method in a cloud-based system for implementing changes to flow engine software that executes user-specific flows for a plurality of users. The method includes: receiving a request to load and execute a user-specific flow; identifying an API version identifier for the user-specific flow; loading the user-specific flow; determining whether a software change to the flow engine software should be applied when executing the user-specific flow based on the API version identifier; and executing the user-specific flow using the flow engine software with the software change when it is determined, based on the API version identifier, that the software change to the flow engine software should be applied.

17 Claims, 5 Drawing Sheets

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,452,360 B1* | 10/2019 | Burman ............. G06Q 10/0633 |
| 10,534,601 B1* | 1/2020 | Venkata .................... G06F 8/65 |
| 11,455,190 B2* | 9/2022 | Bequet .................. G06F 9/4881 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0039494 A1* | 2/2018 | Lander ................ H04L 63/0815 |
| 2018/0321833 A1* | 11/2018 | Nelson ...................... G06F 9/54 |
| 2019/0188209 A1* | 6/2019 | Kim .................... G06F 16/2455 |
| 2020/0135005 A1* | 4/2020 | Katz ...................... G06F 3/0486 |

OTHER PUBLICATIONS

Title: Automatic control of workflow processes using ECA rules, author: J Bae et al, published on 2004.*

Title: OpenFlow as an Architecture for e-Node B Virtualization , author: VD Philip et al, and published on 2011.*

(56) References Cited

OTHER PUBLICATIONS

Title: Dynamic identity federation using security assertion markup language (SAML), author: M Ferdous et al, published on 2013.*

* cited by examiner

SYSTEM AND METHOD FOR FLOW RUNTIME VERSIONING

TECHNICAL FIELD

Embodiments of the subject matter described herein relate generally to platform computing systems, and more particularly to systems and methods for implementing software changes in platform computing systems.

BACKGROUND

Many types of cloud-based platform systems are available to allow a user to run user-specific processes on its data using the hardware and software of the cloud-based platform system. When software changes are made to the platform systems, a user's processes may need to be adjusted to account for changes in the platform software. The adjustments can be minor or significant depending on the software changes.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method in a cloud-based system for implementing behavioral changes to flow engine software that executes user-specific flows for a plurality of users with little or no disruption to the performance of the user-specific flows is disclosed. The method includes: receiving a request to load and execute a user-specific flow; identifying an API version identifier for the user-specific flow; loading (e.g., by an execution engine) the user-specific flow; determining whether a software change to the flow engine software should be applied when executing the user-specific flow based on the API version identifier; and executing the user-specific flow using the flow engine software with the software change when it is determined, based on the API version identifier, that the software change to the flow engine software should be applied.

In another embodiment, a cloud-based system configured to implement behavioral changes to flow engine software that executes user-specific flows for a plurality of users with little or no disruption to the performance of the user-specific flows is disclosed. The system includes a controller configured to: receive a user request to load and execute a user-specific flow; identify an API version identifier for the user-specific flow; load (e.g., by an execution engine) the user-specific flow; determine whether a software change to the flow engine software should be applied when executing the user-specific flow based on the API version identifier; and execute the user-specific flow using the flow engine software with the software change when it is determined, based on the API version identifier, that the software change to the flow engine software should be applied.

In another embodiment, non-transitory computer readable media encoded with programming instructions configurable to cause a controller at a cloud-based platform computing system to perform a method is disclosed. The method includes: receiving a request to load and execute a user-specific flow; identifying an API version identifier for the user-specific flow; loading (e.g., by an execution engine) the user-specific flow; determining whether a software change to the flow engine software should be applied when executing the user-specific flow based on the API version identifier; and executing the user-specific flow using the flow engine software with the software change when it is determined, based on the API version identifier, that the software change to the flow engine software should be applied.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
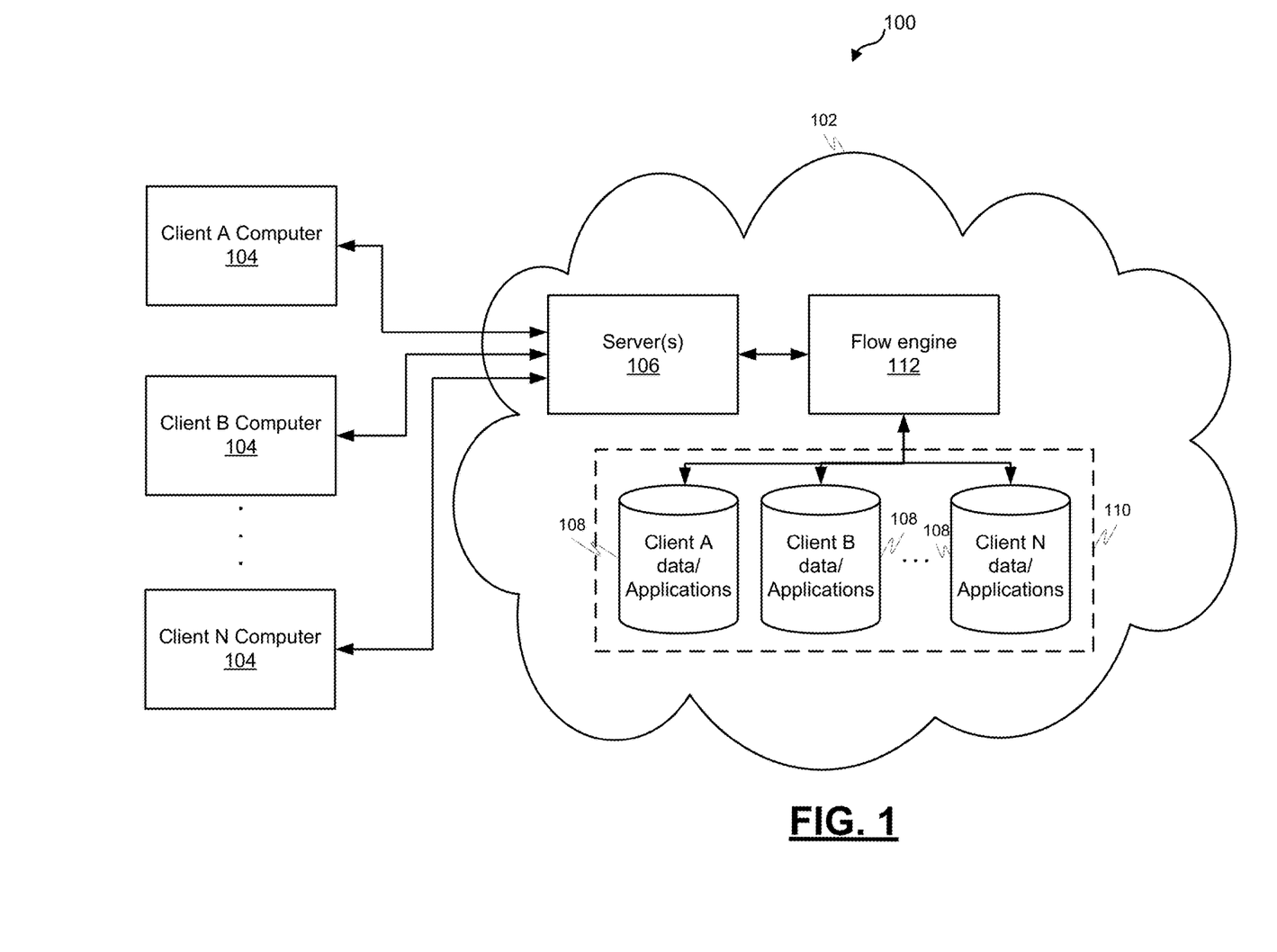
FIG. 1 is a block diagram depicting an example computing environment, in accordance with some embodiments.

FIG. 1 is a block diagram depicting an example computing environment 100. The example computing environment includes a cloud-based platform computing system 102 that provides computing services to a plurality of user devices 104. The user devices 104 may comprise personal computers such as desktop computers, laptop computers, tablet computers, thin client devices, workstations, etc., or any other devices that include one or more processors that are programmed via programming instructions on computer readable media to provide a user interface for allowing a user to receive computing services from the cloud-based platform computing system 102.

The example cloud-based platform computing system 102 comprises a multitenant computing system capable of providing computing services to a plurality of different tenants using shared hardware and software, while keeping each tenant's data separate from other tenant's data. In this example, the cloud-based platform computing system 102 includes one or more servers 106 for interacting with the user devices 104 for storing user data in a tenant-specific partition 108 of a multitenant database system 110, servicing user queries, and causing user defined applications in a tenant-specific partition 108 of a multitenant database system 110 to execute via a flow engine 112 to perform operations on user data. Although the example cloud-based platform computing system 102 comprises a multitenant computer system, the cloud-based platform computing system 102 may comprise other types of platform computing systems that can provide computing capabilities such as other systems that offer software as a service (SaaS) and/or databases.

The example flow engine 112 is implemented using a controller comprising at least one processor and a computer-readable storage device or media encoded with programming instructions from flow engine software for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The flow engine software programs the controller to execute logic specified in user-defined applications (such as user-specific flows) on user data. Because the example flow engine 112 operates within a multitenant environment wherein the example flow engine 112 is shared by multiple tenants, changes to the example flow engine 112 implemented for the benefit of one or more user-specific flows of one tenant may also affect other user-specific flows of the tenant as well as one or more user-specific flows of other tenants. Changes may be in the form of software enhancements to add or improve features and functionality, software bug fixes, or others.

The example cloud-based platform computing system 102 is configured to allow for software changes to the example flow engine 112 for the benefit of one user-specific flow with little or no impact on the performance of other user-specific flows. The example cloud-based platform computing system 102 accomplishes this by using flow runtime versioning. Flow runtime versioning involves determining the correct software version to use with a user-specific flow and using the correct software version when executing the user-specific flow.

Figure 2:
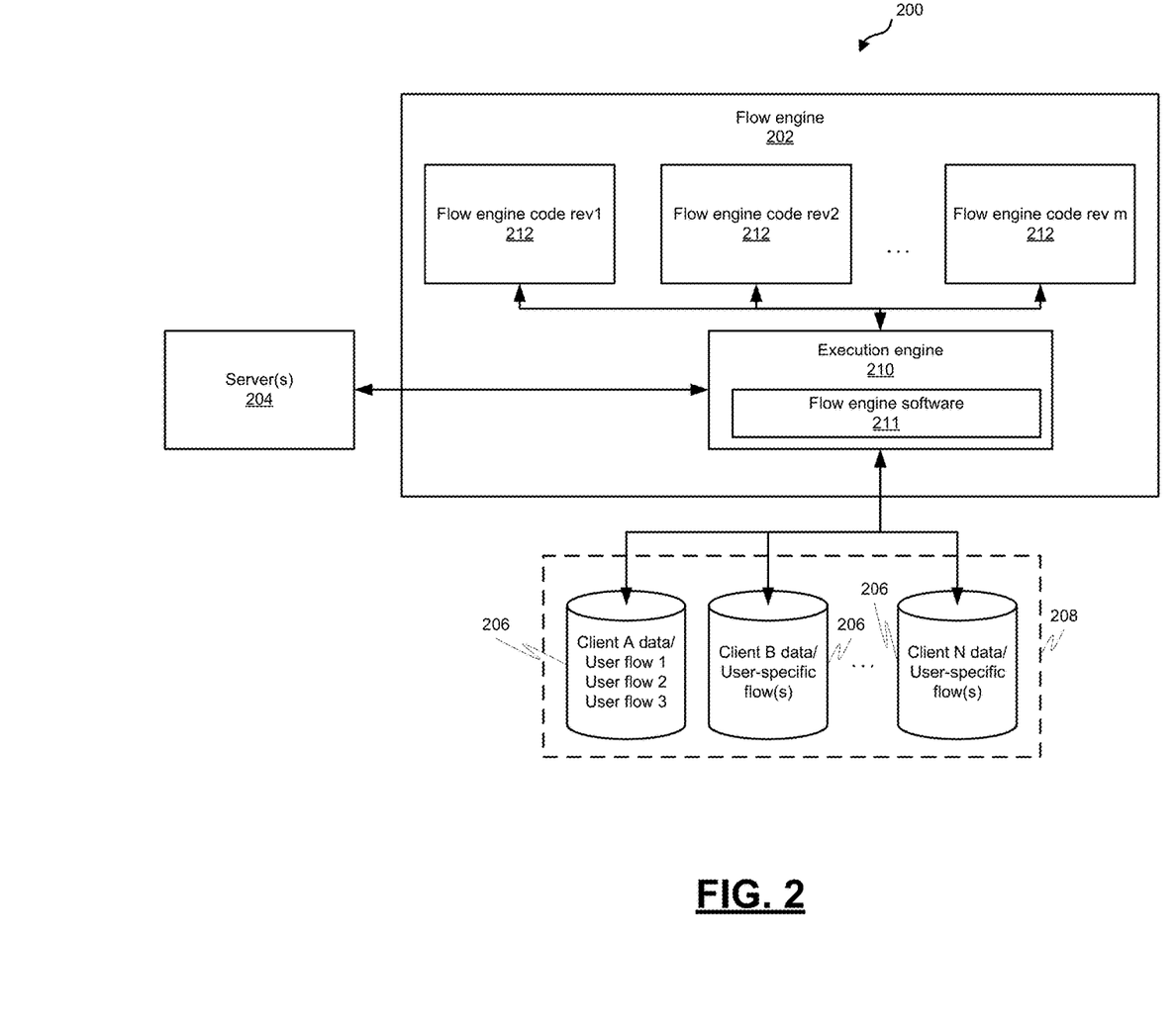
FIG. 2 is a block diagram depicting an example cloud-based platform computing system that is configured for flow runtime versioning, in accordance with some embodiments.

FIG. 2 is a block diagram depicting an example cloud-based platform computing system 200 that is configured for flow runtime versioning. The example cloud-based platform computing system 200 includes a flow engine 202 and one or more servers 204. The one or more servers 204 are configured to interact with user devices (not shown) for storing user data in a tenant-specific partition 206 of a multitenant database system 208, servicing user queries, and causing user defined applications in a tenant-specific partition 206 of the multitenant database system 208 to execute via a flow engine 202 to perform operations on user data.

The flow engine 202 includes an execution engine 210 comprising a controller configured by flow engine software 211 to perform operations specified in user-specific flows on the user data. The flow engine software, however, may have multiple changes 212 developed for the flow engine software 211, and many of the changes 212 may have been developed after certain user-specific flows were developed. Consequently, some of the earlier developed user-specific flows may not perform as intended if executed using the flow engine software 211 with all of the changes 212 implemented. The flow engine 202, however, is configured to perform a check to determine which changes 212 to apply to the flow engine software 211 when executing specific user-specific flows and execute only those changes when executing specific user-specific flows (e.g., perform runtime flow versioning). This can allow changes to be developed and implemented with the flow engine software 211 with little or no impact on the performance of earlier developed user-specific flows.

In one example, a server 204 in a cloud-based platform computing system 200 is configured to: determine whether the process type for a user-specific flow was opted-in for flow runtime versioning and if so, save (e.g., in a user's tenant domain) an identifier (e.g., an API version identifier) for the user-specific flow when the user-specific flow type is saved after generation or modification. The example server 204 is further configured to, responsive to receiving a request to execute a user-specific flow, retrieve the identifier for the user-specific flow (if it had been saved), and provide the identifier to the flow engine 202. The example server 204 is further configured to determine whether the process type for the user-specific flow was opted-in for flow runtime versioning and whether an identifier for the user-specific flow had been saved; assign a default value (e.g., specific for the process type of the user-specific flow) as an API (application program interface) version identifier to the user-specific flow when an identifier for the user-specific flow had not been previously saved or assign the saved identifier as the API version identifier when the identifier had been previously saved.

In this example, the flow engine 202 is configured to retrieve the user-specific flow (e.g., from the user's tenant domain 208); load the user-specific flow; and determine which changes 212 to apply to the flow engine software 211 when executing the user-specific flow. The example flow engine 202 is configured to determine which changes to apply by comparing the API version identifier for the user-specific flow to the API version value necessary to apply a specific change; apply a specific change when the API version identifier has a value that is equal to or greater than an API version value necessary for the flow engine to apply a software change to the flow engine software 211; and execute the user-specific flow using the execution engine 210 with the determined software changes 212 for the flow engine software 211.

Figure 3:
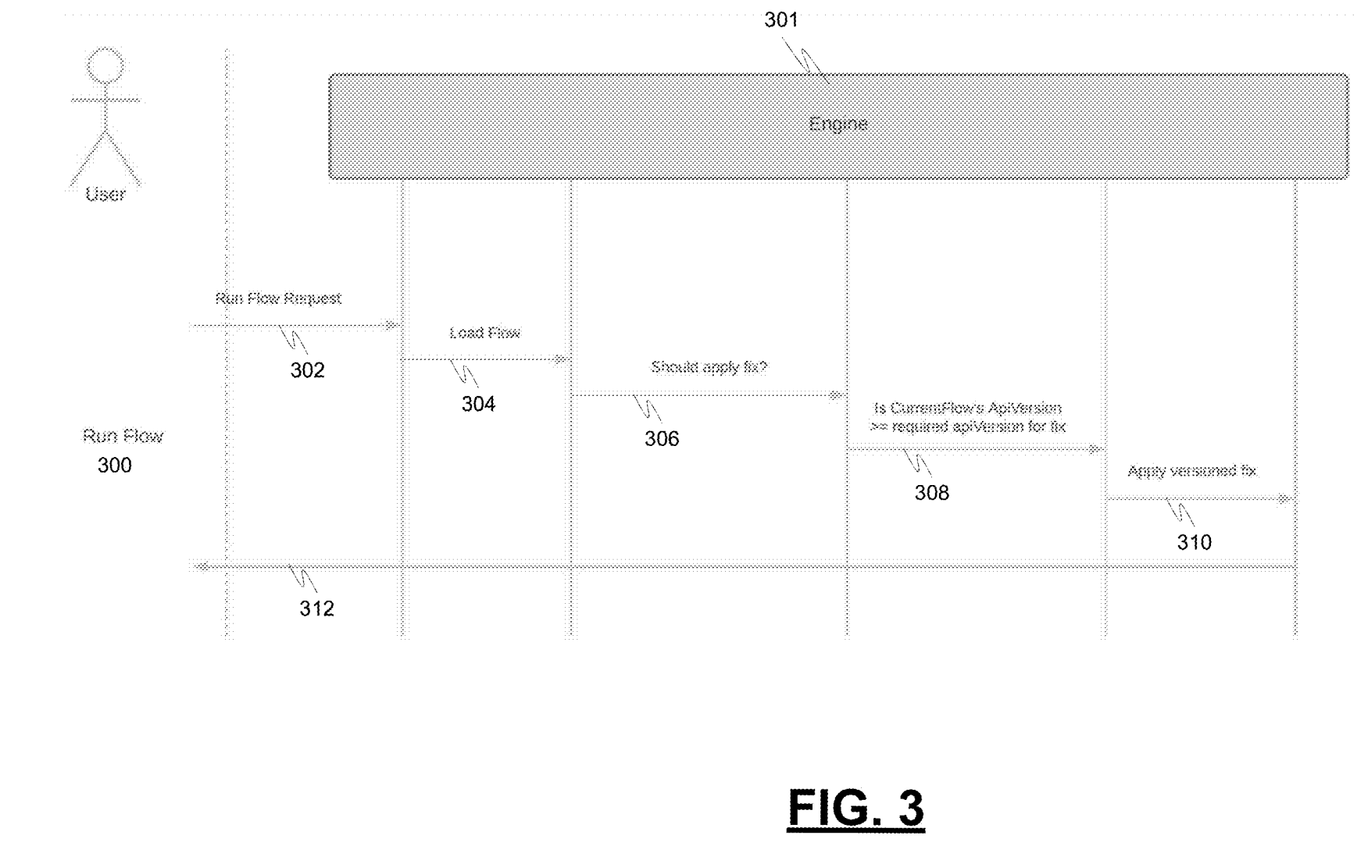
FIG. 3 is a sequence diagram depicting an example process used by a flow engine to determine which changes to flow engine software to use with a user-specific flow, in accordance with some embodiments.

FIG. 3 is a sequence diagram depicting an example process 300 used by a flow engine (e.g., flow engine 112/202) to determine which changes (e.g., changes 212) to flow engine software (e.g., flow engine software 211) to use with a user-specific flow. The example process 300 includes receiving a run flow request (operation 302) along with the API version identifier (e.g., from a server 106/204) for a user-specific flow.

The example process 300 includes loading the user-specific flow (operation 304) and determining which, if any, software changes to the flow engine software should be applied to the flow engine software when executing the user-specific flow (decision 306). The determining may be made by determining whether an API version identifier for the user-specific flow has a value that is equal to or greater than an API version value necessary for the execution engine to apply a specific software change to the flow engine software (operation 308). The example process 300 further includes applying the change when the user-specific flow has a value that is equal to or greater than an API version value necessary for the execution engine to apply a specific software change to the flow engine software (operation 310) and executing the user-specific flow with the appropriate software changes (operation 312).

Figure 4:
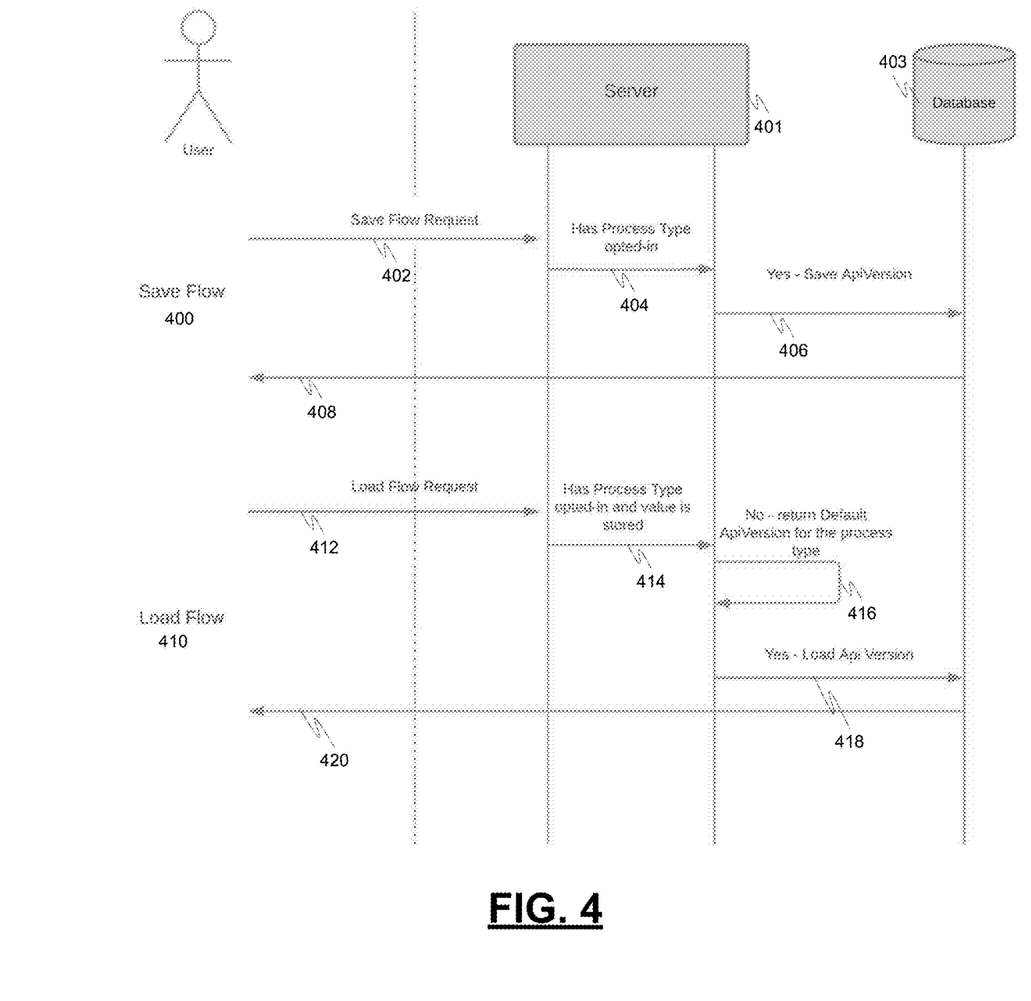
FIG. 4 is a sequence diagram depicting an example process used at a cloud-based platform computing system to associate appropriate software changes to a user-specific flow, in accordance with some embodiments.

FIG. 4 is a sequence diagram depicting an example process 400 used by a server in a cloud-based platform computing system (e.g., cloud-based platform computing system 102/200) to associate appropriate software changes to a user-specific flow. The example process 400 includes receiving (e.g., by server 106/204) a request to save a user-specific flow (operation 402). For example, when an administrator for a user generates or modifies a user-specific flow, the administrator will save the user-specific flow (e.g., to the tenant domain of the user).

The example process 400 includes determining (e.g., by the server 106/204) whether the process type for the user-specific flow was opted-in for runtime flow versioning (decision 404). The user-specific flow has a process type. For example, the user-specific flow may be of the following process types: screen flow, auto-launched flow with no flow trigger, auto-launched flow with a schedule trigger, auto-launched flow with a record trigger, user provisioning flow, field service mobile flow, field service embedded flow, contact request flow, checkout flow, or other flow types. The user (e.g., by an administrator) may opt-in to runtime flow versioning for some, none, or all of its user-specific flow types.

The example process 400 includes saving (e.g., by the server 106/204 (e.g., in a user's tenant domain)) an identifier (e.g., an API version identifier) for the user-specific flow when the user-specific flow type was opted-in for flow runtime versioning (operation 406) and providing an indication that the save was successful (operation 408). For example, an administrator may specify which API version of the software changes to execute with the flow software. When the user-specific flow was not opted-in for flow runtime versioning, a default value for the user-specific flow may or may not be saved. The default value may be set based on the process type for the user-specific flow. Some changes may affect the performance of some process types and not others, and the default value may be set to the most recent software change that is not anticipated to have a detrimental impact on the user-specific flow.

The example sequence diagram also includes an example process 410 used by the server to load a flow responsive to a load flow request from a user. The example process 410 includes receiving a request (e.g., by a user) to load and execute the user-specific flow (operation 412). Responsive to the request, the cloud-based platform computing system can retrieve the user-specific flow and determine which changes to apply to the flow engine software when executing the user-specific flow.

The example process 410 includes determining (e.g., by the server 106/204) whether the process type for the user-specific flow was opted-in for flow runtime versioning and whether an identifier for the user-specific flow had been saved (decision 414).

The example process 410 includes assigning (e.g., by the server 106/204) a default value (e.g., specific for the process type of the user-specific flow) as an API version identifier to the user-specific flow when either the process type for the user-specific flow was not previously opted-in for flow runtime versioning or an identifier for the user-specific flow had not been previously saved (operation 416).

The example process 410 includes assigning (e.g., by the server 106/204) the saved identifier as the API version identifier for the user-specific flow when both the process type for the user-specific flow was opted-in for flow runtime versioning and the identifier (e.g., API version) for the user-specific flow had been previously saved (operation 418), and providing (e.g., by the server 106/204) to the execution engine the API version identifier for the user-specific flow (operation 420).

Figure 5:
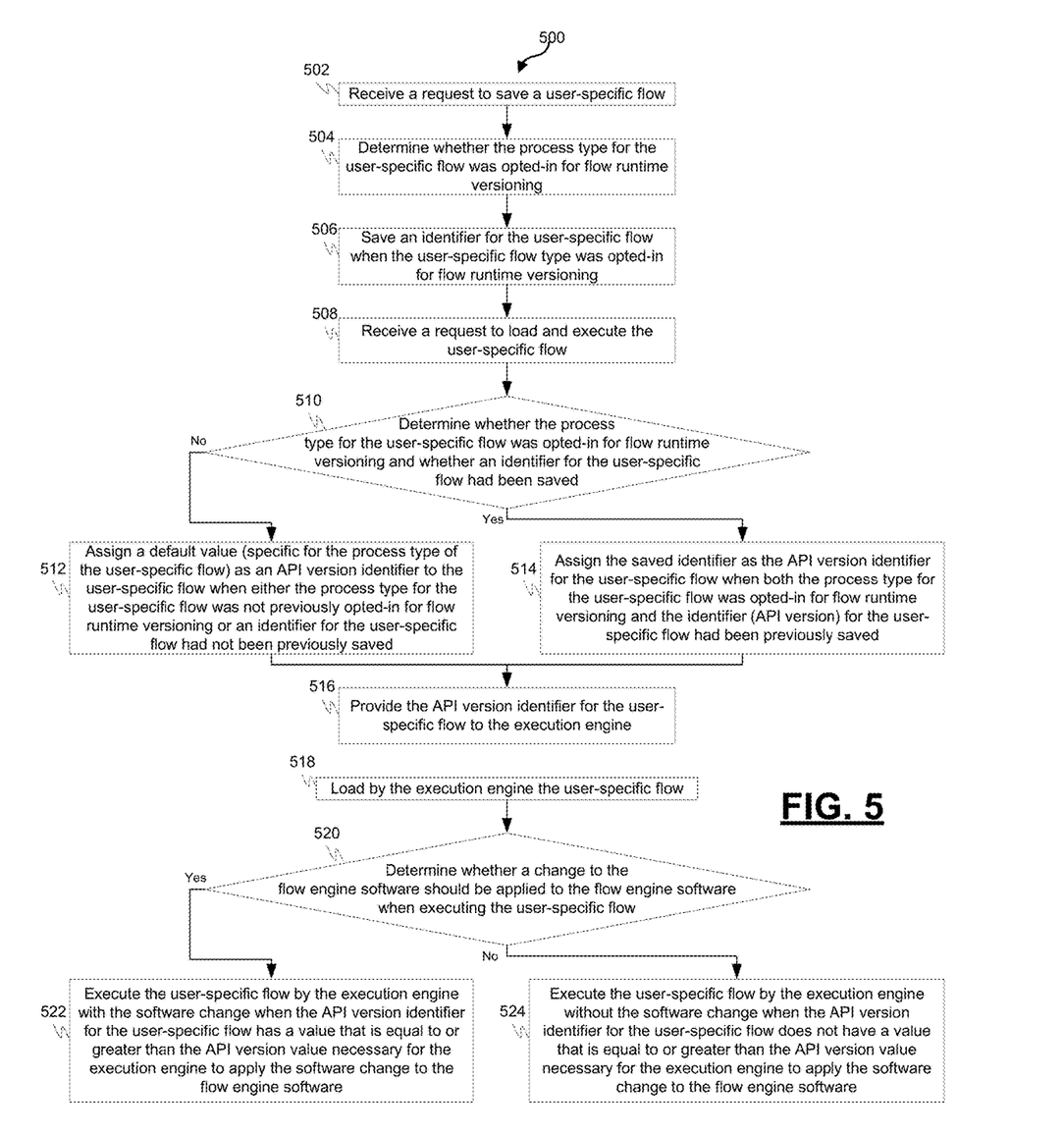
FIG. 5 is a process flow chart depicting an example process for implementing behavioral changes to flow engine software that runs user-specific flows for a plurality of users with little or no disruption to the performance of the user-specific flows, in accordance with some embodiments.

FIG. 5 is a process flow chart depicting an example process 500 for implementing behavioral changes to flow engine software that runs user-specific flows for a plurality of users with little or no disruption to the performance of the user-specific flows. The order of operation within the example process 500 is not limited to the sequential execution as illustrated in the figure, but may be performed in one or more varying orders as applicable and in accordance with the present disclosure.

The example process 500 includes receiving (e.g., by server 106/204) a request to save a user-specific flow (operation 502). When an administrator for a user generates or modifies a user-specific flow, the administrator will save the user-specific flow, for example, to the tenant domain of the user. The user-specific flow has a process type. For example, the user-specific flow may be of the following process types: screen flow, auto-launched flow with no flow trigger, auto-launched flow with a schedule trigger, auto-launched flow with a record trigger, user provisioning flow, field service mobile flow, field service embedded flow, contact request flow, checkout flow, or other flow types.

The example process 500 includes determining (e.g., by the server 106/204) whether the process type for the user-specific flow was opted-in for flow runtime versioning (decision 504). The user (e.g., by an administrator) may opt-in to runtime versioning for some, none, or all of its user-specific flow types.

The example process 500 includes saving (e.g., by the server 106/204 (e.g., in a user's tenant domain)) an identifier (e.g., an API version identifier) for the user-specific flow when the user-specific flow type was opted-in for flow runtime versioning (operation 506). For example, an administrator may specify which API version of the software changes to execute with the flow software. When the user-specific flow was not opted-in for flow runtime versioning, a default value for the user-specific flow may or may not be saved. The default value may be set based on the process type for the user-specific flow. Some changes may affect the performance of some process types and not others, and the default value may be set to the most recent software change that is not anticipated to have a detrimental impact on the user-specific flow.

The example process 500 includes receiving a request (e.g., by a user) to load and execute the user-specific flow (operation 508). Responsive to the request, the cloud-based platform computing system can retrieve the user-specific flow and determine which changes to apply to the flow engine software when executing the user-specific flow.

The example process 500 includes determining (e.g., by the server 106/204) whether the process type for the user-specific flow was opted-in for flow runtime versioning and whether an identifier for the user-specific flow had been saved (decision 510).

The example process 500 includes assigning (e.g., by the server 106/204) a default value (e.g., specific for the process type of the user-specific flow) as an API version identifier to the user-specific flow when either the process type for the user-specific flow was not previously opted-in for flow runtime versioning or an identifier for the user-specific flow had not been previously saved (operation 512).

The example process 500 includes assigning (e.g., by the server 106/204) the saved identifier as the API version identifier for the user-specific flow when both the process type for the user-specific flow was opted-in for flow runtime versioning and the identifier (e.g., API version) for the user-specific flow had been previously saved (operation 514), and providing (e.g., by the server 106/204) to the execution engine the API version identifier for the user-specific flow (operation 516).

The example process 500 includes loading by the execution engine the user-specific flow (operation 518) and determining whether a change to the flow engine software should be applied to the flow engine software when executing the user-specific flow (decision 520). The determining may be made by determining whether the API version identifier for the user-specific flow has a value that is equal to or greater than an API version value necessary for the execution engine to apply the software change to the flow engine software.

The example process 500 includes executing the user-specific flow by the execution engine with the software change when the API version identifier for the user-specific flow has a value that is equal to or greater than the API version value necessary for the execution engine to apply the software change to the flow engine software (operation 522); and executing the user-specific flow by the execution engine without the software change when the API version identifier for the user-specific flow does not have a value that is equal to or greater than the API version value necessary for the execution engine to apply the software change to the flow engine software (operation 524).

In one embodiment, a method in a cloud-based system for implementing behavioral changes to flow engine software that executes user-specific flows for a plurality of users with little or no disruption to the performance of the user-specific flows is provided. The method comprises: receiving a request to load and execute a user-specific flow; identifying an API version identifier for the user-specific flow; loading (e.g., by an execution engine) the user-specific flow; determining whether a software change to the flow engine software should be applied when executing the user-specific flow based on the API version identifier; and executing the user-specific flow using the flow engine software with the software change when it is determined, based on the API version identifier, that the software change to the flow engine software should be applied.

These aspects and other embodiments may include one or more of the following features. The identifying may comprise: determining whether a process type for the user-specific flow was opted-in for flow runtime versioning and whether an identifier (e.g., API version) for the user-specific flow had been saved; assigning (e.g., by the server) a default value (e.g., specific for the process type of the user-specific flow) as the API version identifier to the user-specific flow when either the process type for the user-specific flow was not previously opted-in for flow runtime versioning or an identifier (e.g., API version) for the user-specific flow had not been previously saved; and assigning (e.g., by the server) the saved identifier as the API version identifier for the user-specific flow when the process type for the user-specific flow was opted-in for flow runtime versioning and when the identifier (e.g., API version) for the user-specific flow had been previously saved. The determining whether a software change to the flow engine software should be applied may comprise: determining for the software change whether the API version identifier for the user-specific flow has a value that is equal to or greater than an API version value necessary for the execution engine to apply the software change to the flow engine software. The executing the user-specific flow may comprise: executing the user-specific flow using the execution engine with the software change when the API version identifier for the user-specific flow has a value that is equal to or greater than the API version value necessary for the execution engine to apply the software change to the flow engine software; and executing the user-specific flow by the execution engine without the software change when the API version identifier for the user-specific flow does not have a value that is equal to or greater than the API version value necessary for the execution engine to apply the software change to the flow engine software. The cloud-based system may comprise a server and a flow engine. The server may be configured to identify the API version identifier for the user-specific flow and the flow engine may be configured to determine whether a software change to the flow engine software should be applied when executing the user-specific flow based on the API version identifier. The method may further comprise: receiving, by the server, a request to save the user-specific flow; determining, by the server, whether a process type for the user-specific flow was opted-in for flow runtime versioning; and saving, by the server, the identifier (e.g., API version) for the user-specific flow when the user-specific flow was opted-in for flow runtime versioning.

In another embodiment, a cloud-based system configured to implement behavioral changes to flow engine software that executes user-specific flows for a plurality of users with little or no disruption to the performance of the user-specific flows is provided. The system comprises a controller configured to: receive a user request to load and execute a user-specific flow; identify an API version identifier for the user-specific flow; load (e.g., by an execution engine) the user-specific flow; determine whether a software change to the flow engine software should be applied when executing the user-specific flow based on the API version identifier; and execute the user-specific flow using the flow engine software with the software change when it is determined, based on the API version identifier, that the software change to the flow engine software should be applied.

These aspects and other embodiments may include one or more of the following features. To identify an API version identifier for the user-specific flow, the controller may be configured to: determine whether a process type for the user-specific flow was opted-in for flow runtime versioning and whether an identifier (e.g., API version) for the user-specific flow had been saved; assign (e.g., by the server) a default value (e.g., specific for the process type of the user-specific flow) as the API version identifier to the user-specific flow when either the process type for the user-specific flow was not previously opted-in for flow runtime versioning or an identifier (e.g., API version) for the user-specific flow had not been previously saved; and assign (e.g., by the server) the saved identifier as the API version identifier for the user-specific flow when the process type for the user-specific flow was opted-in for flow runtime versioning and when the identifier (e.g., API version) for the user-specific flow had been previously saved. To determine whether a software change to the flow engine software should be applied, the controller may be configured to: determine for the software change whether the API version identifier for the user-specific flow has a value that is equal to or greater than an API version value necessary for the execution engine to apply the software change to the flow engine software. To execute the user-specific flow, the controller may be configured to: execute the user-specific flow using the execution engine with the software change when the API version identifier for the user-specific flow has a value that is equal to or greater than the API version value necessary for the execution engine to apply the software change to the flow engine software; and execute the user-specific flow by the execution engine without the software change when the API version identifier for the user-specific flow does not have a value that is equal to or greater than the API version value necessary for the execution engine to apply the software change to the flow engine software. The cloud-based system may further comprise a server and a flow engine. The server may be configured to identify the API version identifier for the user-specific flow and the flow engine is configured to determine whether a software change to the flow engine software should be applied when executing the user-specific flow based on the API version identifier. The server may be configured to: receive a user request to save the user-specific flow; determine whether a process type for the user-specific flow was opted-in for flow runtime versioning; and save the identifier (e.g., API version) for the user-specific flow when the user-specific flow was opted-in for flow runtime versioning.

In another embodiment, non-transitory computer readable media encoded with programming instructions configurable to cause a controller at a cloud-based platform computing system to perform a method is provided. The method comprises: receiving a request to load and execute a user-specific flow; identifying an API version identifier for the user-specific flow; loading (e.g., by an execution engine) the user-specific flow; determining whether a software change to the flow engine software should be applied when executing the user-specific flow based on the API version identifier; and executing the user-specific flow using the flow engine software with the software change when it is determined, based on the API version identifier, that the software change to the flow engine software should be applied.

These aspects and other embodiments may include one or more of the following features. The identifying may comprise: determining whether a process type for the user-specific flow was opted-in for flow runtime versioning and whether an identifier (e.g., API version) for the user-specific flow had been saved; assigning (e.g., by the server) a default value (e.g., specific for the process type of the user-specific flow) as the API version identifier to the user-specific flow when either the process type for the user-specific flow was not previously opted-in for flow runtime versioning or an identifier (e.g., API version) for the user-specific flow had not been previously saved; and assigning (e.g., by the server) the saved identifier as the API version identifier for the user-specific flow when the process type for the user-specific flow was opted-in for flow runtime versioning and when the identifier (e.g., API version) for the user-specific flow had been previously saved. The determining whether a software change to the flow engine software should be applied may comprise: determining for the software change whether the API version identifier for the user-specific flow has a value that is equal to or greater than an API version value necessary for the execution engine to apply the software change to the flow engine software. The executing the user-specific flow may comprise: executing the user-specific flow using the execution engine with the software change when the API version identifier for the user-specific flow has a value that is equal to or greater than the API version value necessary for the execution engine to apply the software change to the flow engine software; and executing the user-specific flow by the execution engine without the software change when the API version identifier for the user-specific flow does not have a value that is equal to or greater than the API version value necessary for the execution engine to apply the software change to the flow engine software. The cloud-based platform computing system may comprise a server and a flow engine, and the server may be configured to identify the API version identifier for the user-specific flow and the flow engine may be configured to determine whether a software change to the flow engine software should be applied when executing the user-specific flow based on the API version identifier. The method may further comprise: receiving, by the server, a request to save the user-specific flow; determining, by the server, whether a process type for the user-specific flow was opted-in for flow runtime versioning; and saving, by the server, the identifier (e.g., API version) for the user-specific flow when the user-specific flow was opted-in for flow runtime versioning.

In another embodiment, a method in a cloud-based system for implementing behavioral changes to flow engine software that executes user-specific flows for a plurality of users with little or no disruption to the performance of the user-specific flows is provided. The method comprises: receiving a request to load and execute a user-specific flow; identifying an API version identifier for the user-specific flow, wherein the identifying comprises: determining whether a process type for the user-specific flow was opted-in for flow runtime versioning and whether an identifier (e.g., API version) for the user-specific flow had been saved; and assigning (e.g., by the server) a default value (e.g., specific for the process type of the user-specific flow) as the API version identifier to the user-specific flow when either the process type for the user-specific flow was not previously opted-in for flow runtime versioning or an identifier (e.g., API version) for the user-specific flow had not been previously saved; and assigning (e.g., by the server) the saved identifier as the API version identifier for the user-specific flow when the process type for the user-specific flow was opted-in for flow runtime versioning and when the identifier (e.g., API version) for the user-specific flow had been previously saved. The method further comprises: loading (e.g., by an execution engine) the user-specific flow; and determining whether a software change to the flow engine software should be applied when executing the user-specific flow based on the API version identifier, wherein the determining comprises: determining for the software change whether the API version identifier for the user-specific flow has a value that is equal to or greater than an API version value necessary for the execution engine to apply the software change to the flow engine software; and executing the user-specific flow using the execution engine with the software change when it is determined, based on the API version identifier, that the software change to the flow engine software should be applied, wherein the executing comprises: executing the user-specific flow using the execution engine with the software change when the API version identifier for the user-specific flow has a value that is equal to or greater than the API version value necessary for the execution engine to apply the software change to the flow engine software; and executing the user-specific flow by the execution engine without the software change when the API version identifier for the user-specific flow does not have a value that is equal to or greater than the API version value necessary for the execution engine to apply the software change to the flow engine software.

In another embodiment, a method in a cloud-based system for implementing behavioral changes to flow engine software that executes user-specific flows for a plurality of users with little or no disruption to the performance of the user-specific flows. The method comprises: receiving (e.g., by a server) a request to save a user-specific flow, wherein the user-specific flow has a process type; determining (e.g., by the server) whether the process type for the user-specific flow was opted-in for flow runtime versioning; saving (e.g., by the server (e.g., in a database)) an identifier (e.g., API version) for the user-specific flow when the user-specific flow was opted-in for flow runtime versioning; receiving a request to load and execute the user-specific flow; determining (e.g., by the server) whether the process type for the user-specific flow was opted-in for flow runtime versioning and whether an identifier (e.g., API version) for the user-specific flow had been saved; assigning (e.g., by the server) a default value (e.g., specific for the process type of the user-specific flow) as an API version identifier to the user-specific flow when the process type for the user-specific flow was not previously opted-in for flow runtime versioning or an identifier (e.g., API version) for the user-specific flow had not been previously saved; assigning (e.g., by the server) the saved identifier as the API version identifier for the user-specific flow when the process type for the user-specific flow was opted-in for flow runtime versioning and when the identifier (e.g., API version) for the user-specific flow had been previously saved; providing (e.g., by the server) to an execution engine of a flow engine the API version identifier for the user-specific flow; loading by the execution engine the user-specific flow; determining whether a software change to the flow engine software should be applied to the flow engine software when executing the user-specific flow by determining if the API version identifier for the user-specific flow has a value that is equal to or greater than an API version value necessary for the execution engine to apply the software change to the flow engine software; executing the user-specific flow by the execution engine with the software change when the API version identifier for the user-specific flow has a value that is equal to or greater than the API version value necessary for the execution engine to apply the software change to the flow engine software; and executing the user-specific flow by the execution engine without the software change when the API version identifier for the user-specific flow does not have a value that is equal to or greater than the API version value necessary for the execution engine to apply the software change to the flow engine software.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method in a cloud-based system for implementing changes to flow engine software that executes user-specific flows for a plurality of users, the method comprising:
    receiving a request to load and execute a user-specific flow;
    identifying an API version identifier for the user-specific flow, the identifying comprising:
        determining whether a process type for the user-specific flow was opted-in for flow runtime versioning and whether an identifier for the user-specific flow had been saved;
        assigning a default value as the API version identifier to the user-specific flow when either the process type for the user-specific flow was not previously opted-in for flow runtime versioning or an identifier for the user-specific flow had not been previously saved; and
        assigning the saved identifier as the API version identifier for the user-specific flow when the process type for the user-specific flow was opted-in for flow runtime versioning and when the identifier for the user-specific flow had been previously saved;
    loading the user-specific flow;
    determining whether a software change to the flow engine software should be applied when executing the user-specific flow based on the API version identifier; and
    executing the user-specific flow using the flow engine software with the software change when it is determined, based on the API version identifier, that the software change to the flow engine software should be applied.

2. The method of claim 1, wherein the determining whether a software change to the flow engine software should be applied comprises:
    determining for the software change whether the API version identifier for the user-specific flow has a value that is equal to or greater than an API version value necessary for the execution engine to apply the software change to the flow engine software.

3. The method of claim 2, wherein the executing the user-specific flow comprises:
    executing the user-specific flow using the execution engine with the software change when the API version identifier for the user-specific flow has a value that is equal to or greater than the API version value necessary for the execution engine to apply the software change to the flow engine software; and
    executing the user-specific flow by the execution engine without the software change when the API version identifier for the user-specific flow does not have a value that is equal to or greater than the API version value necessary for the execution engine to apply the software change to the flow engine software.

4. The method of claim 1, wherein the cloud-based system comprises a server and a flow engine.

5. The method of claim 4, wherein the server is configured to identify the API version identifier for the user-specific flow and the flow engine is configured to determine whether a software change to the flow engine software should be applied when executing the user-specific flow based on the API version identifier.

6. The method of claim 4, further comprising:
    receiving, by the server, a request to save the user-specific flow;
    determining, by the server, whether a process type for the user-specific flow was opted-in for flow runtime versioning; and
    saving, by the server, the identifier for the user-specific flow when the user-specific flow was opted-in for flow runtime versioning.

7. A cloud-based system configured by a processor to implement changes to flow engine software that executes user-specific flows for a plurality of users, the system comprising a controller configured to:
    receive a user request to load and execute a user-specific flow; identify an API version identifier for the user-specific flow, wherein to identify an API version identifier for the user-specific flow, the controller is configured to:
        determine whether a process type for the user-specific flow was opted-in for flow runtime versioning and whether an identifier for the user-specific flow had been saved;
        assign a default value as the API version identifier to the user-specific flow when either the process type for the user-specific flow was not previously opted-in for flow runtime versioning or an identifier for the user-specific flow had not been previously saved; and
        assign the saved identifier as the API version identifier for the user-specific flow when the process type for the user-specific flow was opted-in for flow runtime versioning and when the identifier for the user-specific flow had been previously saved;
    load the user-specific flow;
    determine whether a software change to the flow engine software should be applied when executing the user-specific flow based on the API version identifier; and
    execute the user-specific flow using the flow engine software with the software change when it is determined, based on the API version identifier, that the software change to the flow engine software should be applied.

8. The cloud-based system of claim 7, wherein to determine whether a software change to the flow engine software should be applied the controller is configured to:
    determine for the software change whether the API version identifier for the user-specific flow has a value that is equal to or greater than an API version value necessary for the execution engine to apply the software change to the flow engine software.

9. The cloud-based system of claim 8, wherein to execute the user-specific flow the controller is configured to:
   execute the user-specific flow using the execution engine with the software change when the API version identifier for the user-specific flow has a value that is equal to or greater than the API version value necessary for the execution engine to apply the software change to the flow engine software; and
   execute the user-specific flow by the execution engine without the software change when the API version identifier for the user-specific flow does not have a value that is equal to or greater than the API version value necessary for the execution engine to apply the software change to the flow engine software.

10. The cloud-based system of claim 7, further comprising a server and a flow engine.

11. The cloud-based system of claim 10, wherein the server is configured to identify the API version identifier for the user-specific flow and the flow engine is configured to determine whether a software change to the flow engine software should be applied when executing the user-specific flow based on the API version identifier.

12. The cloud-based system of claim 10, wherein the server is configured to:
   receive a user request to save the user-specific flow;
   determine whether a process type for the user-specific flow was opted-in for flow runtime versioning; and
   save the identifier for the user-specific flow when the user-specific flow was opted-in for flow runtime versioning.

13. A non-transitory computer readable medium encoded with programming instructions configurable to cause a controller at a cloud-based platform computing system to perform a method, the method comprising:
   receiving a request to load and execute a user-specific flow; identifying an API version identifier for the user-specific flow, the identifying comprising:
      determining whether a process type for the user-specific flow was opted-in for flow runtime versioning and whether an identifier for the user-specific flow had been saved;
      assigning a default value as the API version identifier to the user-specific flow when either the process type for the user-specific flow was not previously opted-in for flow runtime versioning or an identifier for the user-specific flow had not been previously saved; and
      assigning the saved identifier as the API version identifier for the user-specific flow when the process type for the user-specific flow was opted-in for flow runtime versioning and when the identifier for the user-specific flow had been previously saved;
   loading the user-specific flow;
   determining whether a software change to flow engine software should be applied when executing the user-specific flow based on the API version identifier; and
   executing the user-specific flow using the flow engine software with the software change when it is determined, based on the API version identifier, that the software change to the flow engine software should be applied.

14. The non-transitory computer readable medium of claim 13, wherein the determining whether a software change to the flow engine software should be applied comprises:
   determining for the software change whether the API version identifier for the user-specific flow has a value that is equal to or greater than an API version value necessary for the execution engine to apply the software change to the flow engine software.

15. The non-transitory computer readable medium of claim 14, wherein the executing the user-specific flow comprises:
   executing the user-specific flow using the execution engine with the software change when the API version identifier for the user-specific flow has a value that is equal to or greater than the API version value necessary for the execution engine to apply the software change to the flow engine software; and
   executing the user-specific flow by the execution engine without the software change when the API version identifier for the user-specific flow does not have a value that is equal to or greater than the API version value necessary for the execution engine to apply the software change to the flow engine software.

16. The non-transitory computer readable medium of claim 13, wherein the cloud-based platform computing system comprises a server and a flow engine, and wherein the server is configured to identify the API version identifier for the user-specific flow and the flow engine is configured to determine whether a software change to the flow engine software should be applied when executing the user-specific flow based on the API version identifier.

17. The non-transitory computer readable medium of claim 16, wherein the method further comprises:
   receiving, by the server, a request to save the user-specific flow;
   determining, by the server, whether a process type for the user-specific flow was opted-in for flow runtime versioning; and
   saving, by the server, the identifier for the user-specific flow when the user-specific flow was opted-in for flow runtime versioning.

\* \* \* \* \*